United States Patent
Südow et al.

(10) Patent No.: US 8,816,690 B2
(45) Date of Patent: *Aug. 26, 2014

(54) ELECTROMAGNETIC SENSOR CABLE AND ELECTRICAL CONFIGURATION THEREFOR

(75) Inventors: Gustav Göran Mattias Südow, Solna (SE); Ulf Peter Lindqvist, Segeltorp (SE); Andras Robert Juhasz, Stockholm (SE); Robert A. P. Fernihough, Austin, TX (US)

(73) Assignee: PGS Geophysical AS, Oslo (NO)

( * ) Notice: Subject to any disclaimer, the term of this patent is extended or adjusted under 35 U.S.C. 154(b) by 206 days.

This patent is subject to a terminal disclaimer.

(21) Appl. No.: 13/276,766

(22) Filed: Nov. 21, 2011

(65) Prior Publication Data

US 2013/0127471 A1 May 23, 2013

(51) Int. Cl.
*G01V 3/00* (2006.01)
*G01V 3/08* (2006.01)
*G01V 1/20* (2006.01)

(52) U.S. Cl.
CPC ............... *G01V 3/083* (2013.01); *G01V 1/201* (2013.01)
USPC .......................................... 324/365; 324/347

(58) Field of Classification Search
CPC .................................... G01V 3/38; G01V 3/20
See application file for complete search history.

(56) References Cited

U.S. PATENT DOCUMENTS

| | | | |
|---|---|---|---|
| 4,617,518 A | 10/1986 | Srnka | |
| 5,627,798 A | 5/1997 | Siems et al. | |
| 7,132,831 B2 | 11/2006 | Brabers | |
| 7,139,217 B2 | 11/2006 | Scott | |
| 7,446,535 B1 | 11/2008 | Tenghamn et al. | |
| 7,602,191 B2 | 10/2009 | Davidsson | |
| 7,671,598 B2 | 3/2010 | Ronaess et al. | |
| 7,737,698 B2 | 6/2010 | Tenghamn et al. | |
| 7,834,632 B2 | 11/2010 | Tenghamn et al. | |
| 2006/0238200 A1 | 10/2006 | Johnstad | |
| 2010/0045296 A1 | 2/2010 | Tenghamn | |
| 2011/0260730 A1* | 10/2011 | Sudow et al. | 324/365 |
| 2011/0273179 A1 | 11/2011 | Sudow | |
| 2013/0069657 A1* | 3/2013 | Lindqvist et al. | 324/365 |

OTHER PUBLICATIONS

Johan Mattsson, et al., "Error Analysis and Capability Modelling for Towed Streamer Electromagnetics," First Break, Aug. 2012, pp. 91-96, vol. 30.
Johan Mattsson, et al., "Towed Streamer EM: The Challenges of Sensitivity and Anisotrophy" First Break, Jun. 2013, pp. 155-159, vol. 31.
Chris Anderson, et al., "An Integrated Approach to Marine Electromagnetic Surveying Using A Towed Streamer and Source" First Break, May 2010, pp. 71-75, vol. 28.

* cited by examiner

*Primary Examiner* — Reena Aurora (57) ABSTRACT

A marine electromagnetic sensor cable system includes a first sensor cable subsystem including at least a first sensor cable segment. The first sensor cable segment includes a plurality of spaced apart electrodes which electrically contact a body of water when the first sensor cable segment is immersed therein, and an electrical conductor coupled to each electrode, each electrical conductor extending from one longitudinal end of the sensor cable segment to the other. The system includes a first signal processing module electrically coupled to a longitudinal end of the first sensor cable segment, and including a voltage measuring circuit electrically connected between two or more electrodes from the first plurality of electrodes. Marine electromagnetic surveys are conducted using the marine electromagnetic sensor cable system.

26 Claims, 5 Drawing Sheets

ELECTROMAGNETIC SENSOR CABLE AND ELECTRICAL CONFIGURATION THEREFOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine electromagnetic surveying of subsurface formations. More specifically, the invention relates to electrical configurations for electromagnetic sensor cables used in such surveying.

Marine electromagnetic geophysical surveying may be used to infer spatial distribution of electrical conductivity of rock formations below the bottom of a body of water such as a lake or ocean. The spatial distribution of conductivity may be used to assist in determining presence of hydrocarbon bearing formations in the subsurface. One type of such electromagnetic geophysical surveying is known as "controlled source" electromagnetic surveying, and generally includes inducing a time varying electromagnetic field in the subsurface formations and measuring one or more parameters related to a response of the subsurface rock formations to the induced electromagnetic field.

Devices for inducing such electromagnetic fields are generally referred to as "sources" or "transmitters" and include, among other devices, spaced apart electrodes or wire loops or coils disposed along or at the end of a cable. The cable may be towed by a vessel in the body of water. Time varying electric current is imparted across the electrodes, loops or coils generally from a power source located on the vessel, to induce a time varying electromagnetic field in the water and subsequently in the subsurface formations. The electrodes, wire loops or coils may be suspended at a selected depth in the water by the use of floatation devices such as buoys, or the source cable itself may be neutrally or otherwise buoyant.

The response of the subsurface formations below the water bottom may be detected by various sensors which may be disposed on long cables or "streamers" towed in the water behind the survey vessel or a different vessel. In some examples, the streamer includes pairs of spaced apart electrodes to detect an electric potential component in the electromagnetic field response.

The direct electromagnetic field strength decreases rapidly with respect to distance from the electromagnetic field source in an electromagnetic (EM) measurement system. The corresponding responsive electromagnetic field modulated by the subsurface rock formations decreases even more rapidly with respect to distance from the source. When electrode pairs are used to detect the electric potential component in the EM field, such pairs need to have a short separation between the elements of the pair when the pair is disposed close to the source in order to not saturate an input amplifier typically associated with the electrode pair. At longer distances (receiver distance from the source, called "offset") from the source the electrodes in respective pairs may need to be separated by greater distances in order to be able to measure the weaker electric potential component.

Marine streamers are typically assembled from segments each about 75 meters length, and may include a number of such interconnected segments such that the total streamer length may be several kilometers. "Short" electrode pairs can typically be fitted within a standard marine geophysical streamer segment length of 75 m, while longer electrode pair lengths can be many times longer than the length of a typical streamer segment. The spacing requirements for near offset and long offset electrode pairs are thus contradictory with respect to designing a single streamer wiring configuration.

What is needed is a wiring configuration that can be used in a marine sensor streamer having selectable spacing between respective pairs of electrodes.

DETAILED DESCRIPTION

Figure 1:
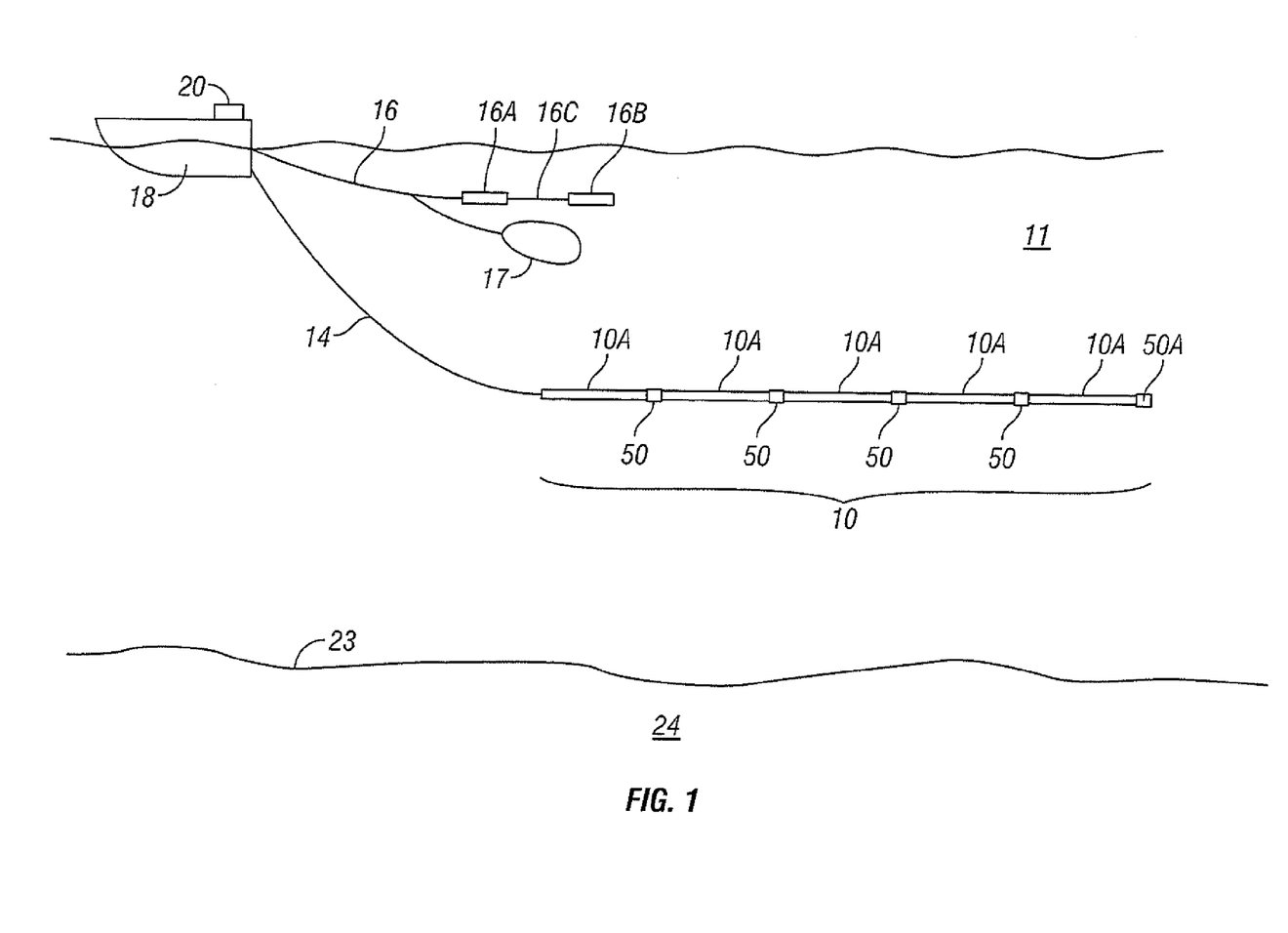
FIG. 1 shows an example embodiment of a marine electromagnetic survey system using sensor cables according to the invention.

An example embodiment of a marine electromagnetic survey system is shown schematically in FIG. 1. The electromagnetic survey system includes a sensor cable 10 that may be assembled from a plurality of cable segments 10A, signal processing modules ("modules") 50 and an end plug 50A at the aft end (with respect to towing direction) of the sensor cable 10. The cable segments 10A will be explained in more detail below with reference to FIG. 2. Some of the modules 50 may include various interconnection and signal processing circuits as will be explained with reference to FIG. 3. The sensor cable 10 is shown being towed at the end of a tow cable 14 by a survey vessel 18 moving on the surface of a body of water 11 such as a lake or an ocean. The sensor cable 10 may alternatively be deployed on the water bottom 23. Alternatively, more than one such sensor cable may be towed by the survey vessel 18 or another vessel (not shown) or one or more additional sensor cables may be deployed on the water bottom. The end plug 50A may be provided in some embodiments to exclude water from entering an exposed termination (explained with reference to FIG. 2) at the aft end of the aftmost cable segment 10A or module 50. The end plug 50A need not include any electrical or optical circuitry therein.

The vessel 18 may include thereon equipment, shown generally at 20 and referred to for convenience as a "recording system" that may include devices (none shown separately) for navigation, energizing electrodes or antennas for imparting an electromagnetic field in the formations 24 below the water bottom 23, and for recording and processing signals generated by the various sensors (FIG. 2) on the sensor cable 10.

The electromagnetic survey system shown in FIG. 1 may include an electromagnetic source cable 16 for inducing an electromagnetic field in the formations below the water bottom 23. The source cable 16 may consist of a tow cable coupled to the vessel 18 and including insulated electrical conductors (not shown) and a strength member (not shown separately) to transmit axial towing force from the vessel 18. The aft end (with respect to towing direction) of the tow cable may be coupled to one end of a first electrode cable 16A. The aft end of the first electrode cable 16A may be coupled to a spacer rope or cable 16C. The aft end of the spacer rope or cable 16C may be coupled to the forward end (with respect to towing direction) of a second electrode cable 16B. The source cable 16 may be towed by the survey vessel 18 or by a different vessel (not shown). The electrode cables 16A, 16B may be energized at selected times by an electrical current source (not shown separately) in the recording system 20 or in other equipment (not shown) so as to induce a time varying electromagnetic field in the formations below the water bottom 23. The current may be alternating current or switched direct current (e.g., switching current on, switching current off, reversing current polarity, or sequential switching such as a pseudorandom binary sequence). The configuration shown in FIG. 1 induces a horizontal dipole electric field in the subsurface when the electrodes 16A, 16B are energized by the electric current. The type of current used to energize the electrodes is not limited to the foregoing as the invention is applicable to use with both frequency domain (continuous output and transient induced electromagnetic fields.

Additionally, or alternatively, as will be appreciated by those skilled in the art, the electric current may be passed through a wire loop or coil 17 towed by the source cable 16. Electric current as explained above so passed through the coil 17 will induce a time varying magnetic field, and thus an electromagnetic field, in the water 11 and the formations 24 below the water bottom.

Figure 2:
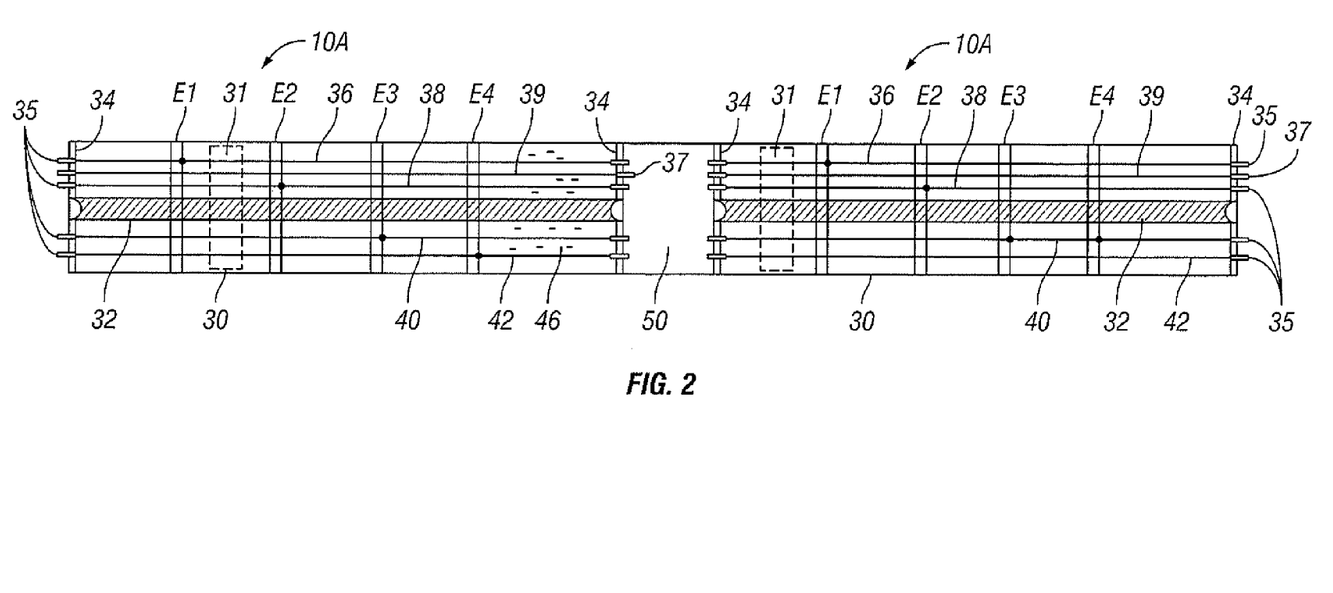
FIG. 2 shows an example embodiment of sensor cable segments having reversible wiring to electrodes disposed on the surface of the segment.

Example embodiments of sensor cable segments forming part of the cable of FIG. 1 are shown schematically in FIG. 2. A sensor cable segment 10A may include a water resistant, electrically non-conductive jacket 30 such as may be made from polyurethane or similar plastic. The jacket 30 may extend the entire length of the segment 10A. At longitudinal ends of the segment 10A, a termination plate 34 may be disposed. The termination plate 34 may be configured to sealingly engage the interior surface of the end of the jacket 30, and may include electrical connectors 35 therein for making electrical connection to an adjacent sensor cable segment 10A or to an electronic module 50. Example circuitry for one or more modules 50 will be further explained with reference to FIG. 3. The segment 10A may include one or more strength members 32 disposed inside the jacket 30 and coupled at the longitudinal ends thereof to a respective termination plate 34. Axial loading during towing the sensor cable (10 in FIG. 1) through the water may be carried by the strength member 32, which may be made, for example, from natural or synthetic fiber rope.

Each sensor cable segment 10A may include disposed on an exterior surface of the jacket 30 a plurality of spaced apart electrodes E1, E2, E3, E4. The electrodes E1, E2, E3 E4 may be arranged on the jacket 30 to be in contact with the water, and may be sealingly engaged to the jacket 30 to resist intrusion of water into the interior of the jacket 30. The electrodes E1, E2, E3, E4 may be any electrode structure known in the art for use with electromagnetic sensing cables or sensor cables. Each electrode E1, E2, E3, E4 may be electrically coupled to a respective electrical conductor 36, 38, 40, 42 disposed inside the jacket 30 and terminated at each longitudinal end in one of the electrical connectors 35 in each termination plate 34. The electrical conductors 36, 38, 40, 42 may extend and connect to the electrical connectors 35 in each termination plate 34 so that electrical connection to each electrode E1, E2, E3, E4 may be possible at each end of the sensor cable segment 10A. In some embodiments, the electrical connectors 35 in each termination plate 34 may be hermaphroditic so that the segment 10A may be coupled in a sensor cable (10 in FIG. 1) in either longitudinal direction and provide the same electrical connections to the respective electrodes E1, E2, E3, E4. It should be noted that using such hermaphroditic connectors is optional. While the example embodiment of the sensor cable segment 10A shown in FIG. 2 includes four electrodes and four corresponding electrical conductors, it should be clearly understood that any convenient number of electrodes and corresponding electrical conductors may be used in other embodiments without exceeding the scope of the present invention.

The sensor cable segment 10A may include one or more buoyancy spacers 31. Such spacers 31 may be made from foamed polypropylene so as to be substantially rigid, yet provide buoyancy to the sensor cable segment 10A. The number of buoyancy spacers will depend on the weight in water of the other components of the sensor cable segment 10A and the desired buoyancy for the sensor cable segment 10.

In addition to the electrical conductors 36, 38, 40, 42 some embodiments of the sensor cable segment 10A may include one or more optical fibers 39 extending inside the jacket 30 from one termination plate 34 to the other and may be terminated therein by suitable optical connectors 37. The optical fiber(s) 39 may be used in some embodiments to communicate signals, for example, commands from the recording unit (20 in FIG. 1) and data to the recording unit (20 in FIG. 1) to and from the various modules 50 without generating electrical interference.

Void space in the interior of the jacket 30 may be filled with a buoyancy void filler 46, such as may be made from a polymerizing agent dispersed in oil or kerosene. Such material may be introduced into the interior of the jacket 30 in liquid form and may subsequently change state to semi-solid, such as a gel. Such material may further resist entry of water into the interior of the jacket 30 and may reduce the possibility of leakage of hazardous material into the water in the event the jacket 30 becomes damaged. Such materials are known in the art to be used in making seismic sensor streamers.

Figure 3:
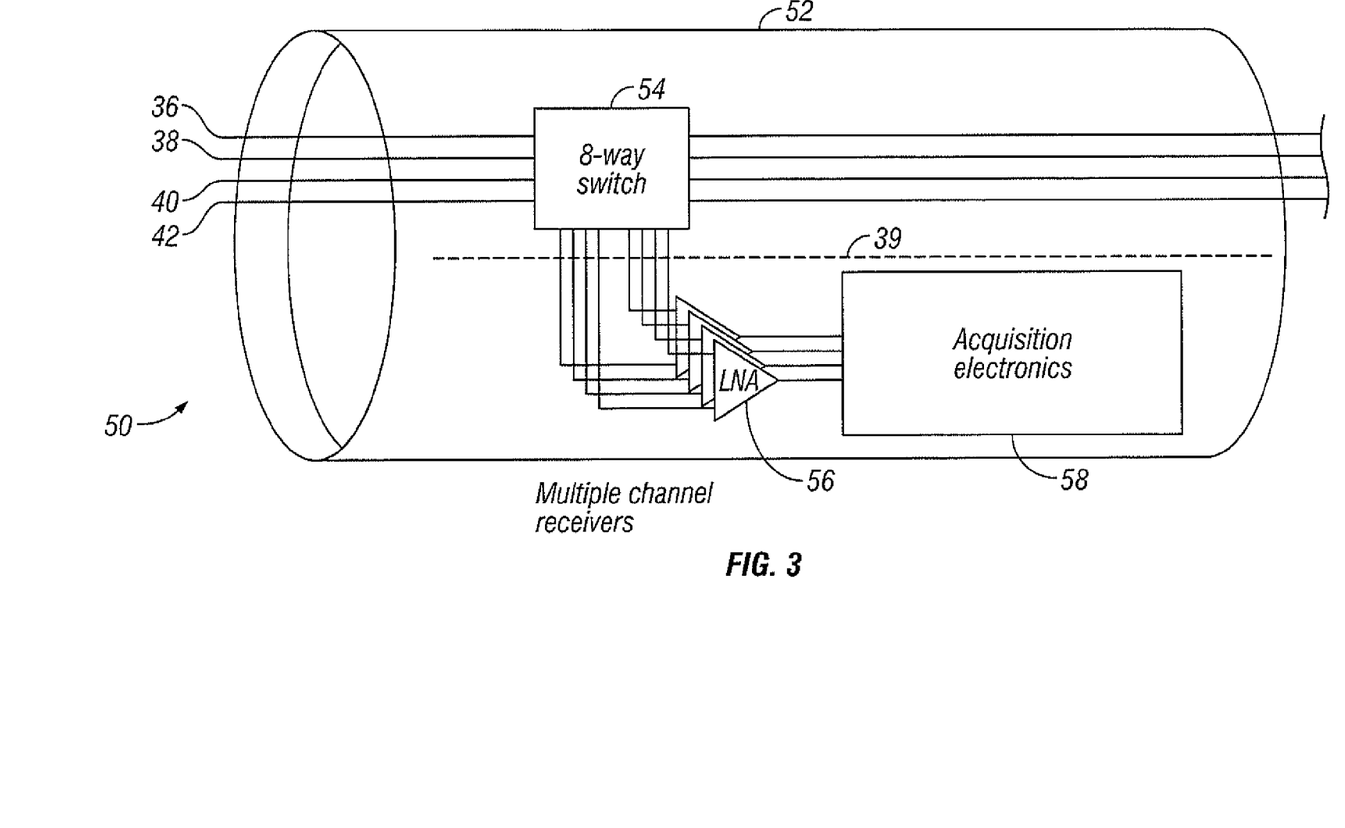
FIG. 3 shows an example embodiment of a signal processing module.

The two sensor cable segments 10A in FIG. 2 are shown coupled to opposite ends of one of the signal processing modules 50. Referring to FIG. 3, the signal processing modules 50 may each have a housing 52 made from a high strength, preferably non-magnetic material, for example, titanium, stainless steel or high strength plastic. The signal processing modules 50 may include terminations (see FIG. 2) on both longitudinal ends that each may make both mechanical and electrical and/or optical connection to the termination plate (34 in FIG. 2) at one end of one of the sensor cable segments (10A in FIG. 2). The housing 52 and terminations may be configured to exclude water entry from an interior space inside the housing 52. The electrical conductors 36, 38, 40, 42 and the optical conductor 39 described above with reference to FIG. 2 may be electrically and optically continued from the termination on each side of the housing 52 through the interior of the housing 52. The electrical conductors 36, 38, 40, 42 may be coupled to a multi-pole switch, which in the present example embodiment may be an eight-pole switch 54. The eight-pole switch 54 enables selected ones of the electrodes (E1, E2, E3, E4 in FIG. 2) to be electrically coupled to input terminals of one or more low noise amplifiers 56. There may be a plurality of low noise amplifiers 56 as shown, or, alternatively a smaller number of low noise amplifiers having multiplexers (not shown) coupled between the switch 54 and inputs to the low noise amplifiers 56. The combination of switch 54 (and/or multiplexer) and low noise amplifiers 56 enables electric potential signals from any selected pair of electrodes in the two sensor cable segments (10A in FIG. 2) to be measured. The signals measured may be voltage related to the amplitude of the electric field between the selected electrodes (i.e., the circuits are arranged such that the selected electrodes are coupled across the input to a voltage measuring circuit). Measurement may be made using a mixed signal device such as a combined analog to digital converter, programmer, data storage and controller ("controller"), shown at 58 in FIG. 3. Such devices are known in the art and may be application specific integrated circuits, or combinations of circuit elements to perform substantially the same functions. The controller 58 may also include internal or external circuitry (not shown separately) to convert electrical signals to optical signals. Optical signals may be communicated to the recording unit (20 in FIG. 1) and/or to other ones of the signal processing modules 50 in the sensor cable (10 in FIG. 1). Using optical signal communication between signal processing modules and between the recording unit (20 in FIG. 1) and the signal processing modules 50 may reduce any noise introduced into the electrical field measurements made between selected pairs of the electrodes.

As would be understood by one of ordinary skill in the art with the benefit of this disclosure, switch 54 may be comprise an exchangeable fixed wiring implemented before survey operations begin, or alternatively switch 54 may comprise a software controlled electronic switch to provide dynamic switching during survey operations (e.g., while towing the marine electromagnetic sensor cable system through the body of water). Some embodiments of the signal processing module 50 may omit the multi-pole switch 54 or equivalent multiplexer and switch combination and include only one or more low noise amplifier 56. The inputs to the low noise amplifier 56 may be made directly to selected ones of the electrical conductors 36, 38, 40, 42 depending on the desired electrical configuration of the sensor cable (10 in FIG. 1).

Potential signals measured between selected pairs of the electrodes in two sensor cable segments 10A interconnected by a signal processing module 50 may be combined with measurements made and/or stored in different signal processing modules (50 in FIG. 1) to synthesize signal measurements corresponding to any selected pair of electrodes by communicating signals optically (or electrically) between signal processing modules 50.

Figure 4:
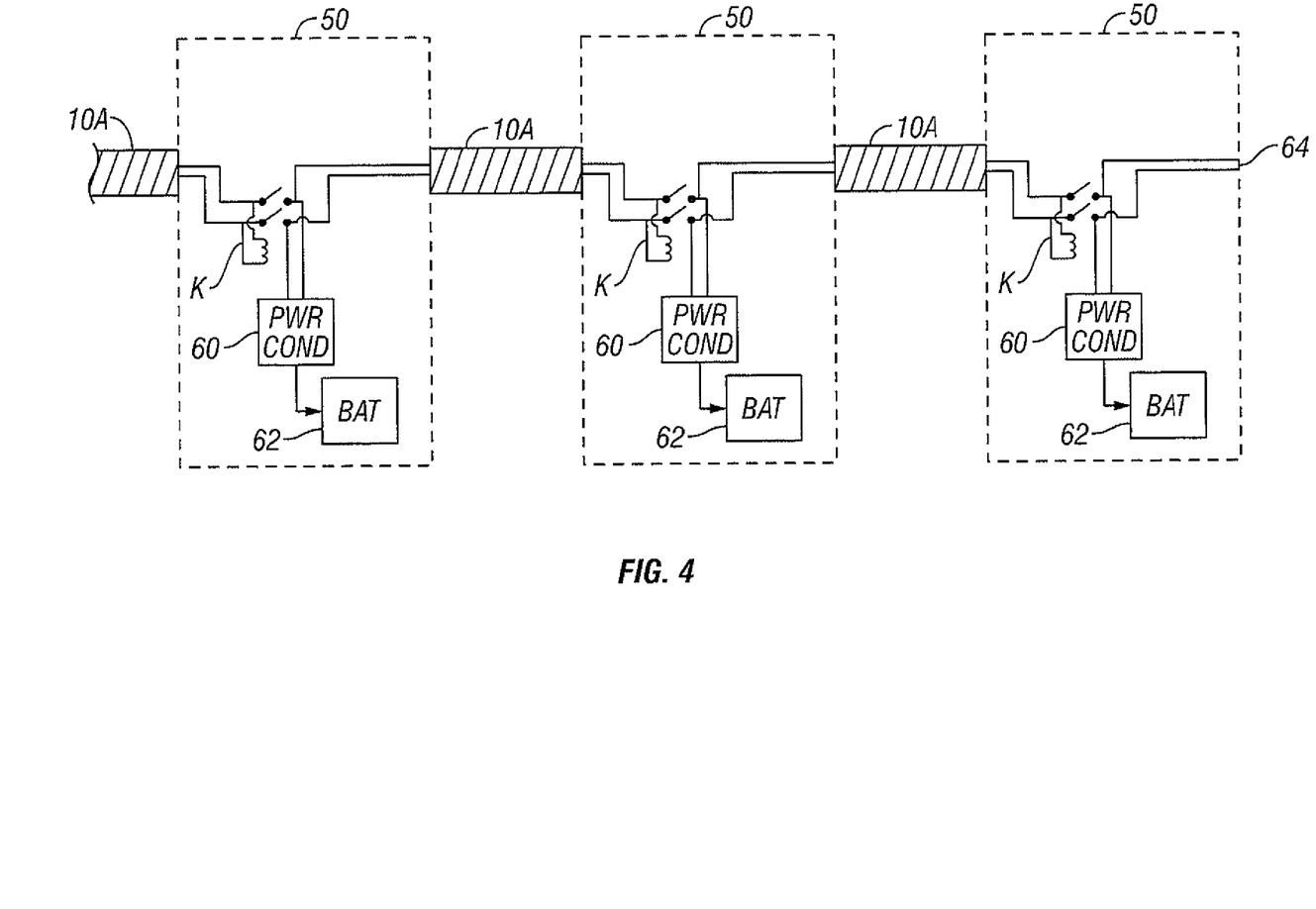
FIG. 4 shows a power circuit that may be used in some embodiments of a module according to FIG. 3.

To further reduce introduction of electrical noise into the measurements made across the various pairs of electrodes, it may be desirable to have an electrical power source to operate each of the signal processing modules 50 disposed in or associated with each of the signal processing modules 50. Referring to FIG. 4, each signal processing module 50 may include a relay K, a power conditioner 60 and a battery 62 or other electrical energy storage device. The battery 62 may be used to operate the electrical circuitry in each signal processing module 50 as described with reference to FIG. 3. In the present embodiment, each sensor cable segment 10A may include power conductors 64 ultimately coupled to an electric power source, such as high voltage AC or DC, in the recording unit (20 in FIG. 1). In the present embodiment, during survey operations, the power conductors will typically not be energized. Therefore, each relay K is in its normally open position. In such position, connections between signal processing modules 50 of the power conductors are opened, so that no inductive loops are formed by the power conductors 64. Between surveys, the power conductors 64 may be energized. By energizing the power conductors 64 all the relays K move to their normally closed position. Electrical power is thereby conducted to the power conditioner 60 in each signal processing module 50 to charge the respective battery 62 therein for continued surveying operations.

Figure 5:
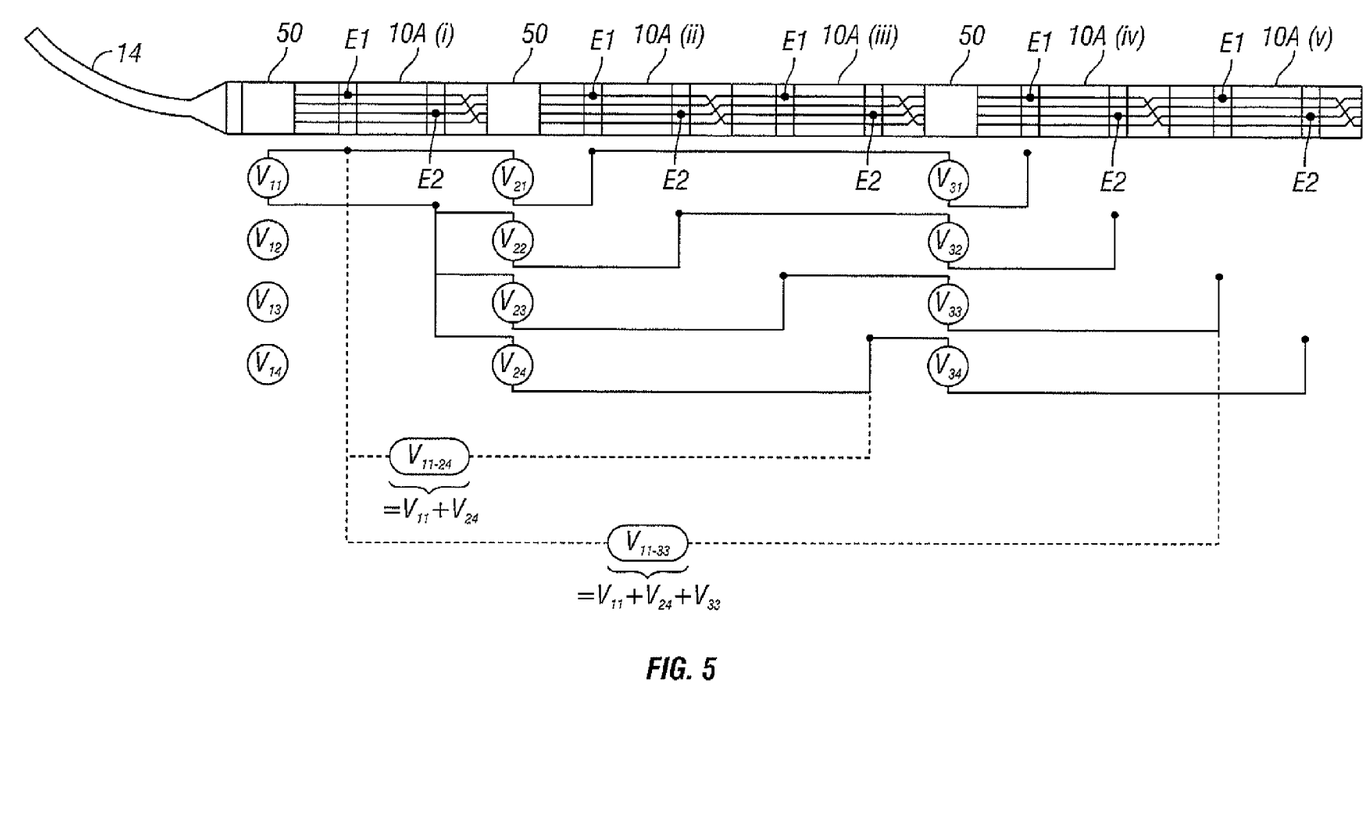
FIG. 5 shows an example embodiment of interconnected sensor cable segments.

Another example embodiment is shown in FIG. 5, wherein each sensor cable segment 10A may include a selected number of electrodes E, for example, two. Each sensor cable segment 10A(i)-10A(v) may include a selected number of electrical conductors extending the length of the entire sensor cable segment 10A, for example, four, so that electrical connection to each electrode E may be made from either end of the sensor cable segment 10A. The example in FIG. 5 shows the tow cable 14 connected to a first signal processing module 50. A first sensor cable segment 10A(i) as explained with reference to FIG. 2 may be connected to the first signal processing module 50 connected to the end of the tow cable. A second signal processing module 50 may be connected to the other end of the first sensor cable segment 10A(i). One or more additional sensor cable segments 10A(ii)-10A(iii) may be connected end to end as shown, and then connected to a third signal processing module 50. Internal through wiring may be provided such that in some example embodiments, the direction of the sensor cable segment as it is connected to adjacent components may be made in either axial direction (although this is not a requirement of the invention). Using a configuration such as shown in FIG. 5 it may be possible to connect sensor cable segments in such manner as to obtain a selected distance between pairs of electrodes connected to the circuits in the signal processing modules 50, for example, there may be an increasing distance between electrodes (E1 through E4 in FIG. 2) with respect to offset (distance between the selected electrode pairs and the source (16A, 16B and/or 17 in FIG. 1).

In the specific embodiment illustrated in FIG. 5, each sensor cable segment 10A(i)-10A(v) includes two electrodes E1-E2 and four electrical conductors. The potential between a first electrode and a second electrode measured at each signal processing module on each electrical conductor is illustrated as follows:

| First Electrode | | Second Electrode | | Voltage |
|---|---|---|---|---|
| E1 | 10A(i) | E2 | 10A(i) | V 11 |
| E1 | 10A(i) | E1 | 10A(ii) | V 21 |
| E1 | 10A(ii) | E1 | 10A(iv) | V 31 |
| E2 | 10A(i) | E2 | 10A(ii) | V 22 |
| E2 | 10A(ii) | E2 | 10A(iv) | V 32 |
| E2 | 10A(i) | E1 | 10A(iii) | V 23 |
| E1 | 10A(iii) | E1 | 10A(v) | V 33 |
| E2 | 10A(i) | E2 | 10A(iii) | V 24 |
| E2 | 10A(iii) | E2 | 10A(v) | V 34 |

These voltages may be combined to synthesize voltage measurements between additional electrode pairs. For example, the voltage between electrode E1 on sensor cable segment 10A(i) and electrode E2 on sensor cable segment 10A(iii) may be synthesized by the addition of V11 and V24. Similarly, the voltage between electrode E1 on sensor cable segment 10A(i) and electrode E1 on sensor cable segment 10A (v) may be synthesized by the addition of V11, V24, and V33. Consequently, by selecting the number of electrodes and the number of electrical conductors for each sensor cable, and by selectively measuring the potential between certain pairs of electrodes, the potential between any selected pair of electrodes on the sensor cable may be synthesized. This allows for strategic selection of distance between electrodes for potential measurement without need to modify the design or construction of the sensor cable. Synthesis of potential signals from one or more measured or synthesized potential signals may be done at any one or more of the signal processing modules and/or at the recording system. Such synthesis may include both addition and subtraction of potential signals.

In some embodiments, a "sensor cable subsystem" may include a signal processing module 50 coupled to one or more sensor cable segments 10A which are coupled together at longitudinal ends. For example, FIG. 2 shows a single sensor cable subsystem coupled to a second sensor cable segment, while FIG. 5 shows three sensor cable subsystems coupled together. As previously discussed, the circuitry of a sensor cable subsystem is configured to allow measurement of electric potential signals by signal processing module 50 between any selected pair of electrodes disposed on any of the sensor cable segments in the sensor cable subsystem. In a sensor cable such as shown in FIG. 1, a plurality of such sensor cable subsystems may be connected end to end as shown, with a forward end (with respect to towing direction) of the plurality of subsystems connected to a cable from the survey vessel (18 in FIG. 1) or other tow vessel. The aft end (with respect to towing direction) of the interconnected subsystems may include an end plug 50A. Additionally, the switch (54 in FIG. 3) in each signal processing module 50 may be configured so that electrical voltage signals may be measured across any selected pair of electrodes disposed on any of the sensor cable segments in the receiver sensor cable. In some embodiments, only a single sensor cable subsystem may be used. The aft end of the single sensor cable subsystem in such embodiments may be coupled to an end plug (50A in FIG. 1) as explained above. In such embodiments, terminals from the switch (54 in FIG. 3) that would otherwise be connected to an aft sensor cable segment may remain unconnected.

An electromagnetic sensor cable made according to the invention may provide a high degree of flexibility in selecting electrode spacing for measuring electric potential components in an induced electromagnetic field, so that, for example, electrode spacing for individual measurements may be selectively related to offset, while simplifying and standardizing construction of sensor cable segments and signal processing modules.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic sensor cable system, comprising a first sensor cable subsystem comprising:
   at least a first sensor cable segment comprising:
      a first plurality of spaced apart electrodes positioned with respect to the first sensor cable segment to electrically contact a body of water when the first sensor cable segment is immersed therein, and
      a first plurality of electrical conductors, each of the first plurality of electrical conductors extending from one longitudinal end of the first sensor cable segment to the other,
      wherein each of the first plurality of spaced apart electrodes is respectively coupled to a different conductor from the first plurality of electrical conductors; and
   a first signal processing module electrically coupled to the first sensor cable segment at a longitudinal end thereof, the signal processing module including a first voltage measuring circuit electrically connected between two or more electrodes from the first plurality of electrodes.

2. The system of claim 1 wherein the first signal processing module comprises a first multi-pole switch configured to make selective connection between any pair of the two or more electrodes connected to the first voltage measuring circuit.

3. The system of claim 2 wherein the multi-pole switch comprises a software controlled electronic switch.

4. The system of claim 1 wherein the first signal processing module comprises circuitry capable of amplifying and digitizing measurements of voltage made between any pair of the two or more electrodes connected to the first voltage measuring circuit.

5. The system of claim 4 further comprising an electrical to optical converter coupled to an output of the digitizing circuitry, an optical fiber coupled to an output of the converter and wherein the first sensor cable segment comprises an optical fiber extending from one longitudinal end of the first sensor cable segment to the other.

6. The system of claim 1 further comprising an end plug coupled to a longitudinal end of the first sensor cable subsystem.

7. The system of claim 1 further comprising an hermaphroditic connector disposed at each longitudinal end of the sensor cable segment.

8. The system of claim 1 wherein the first sensor cable subsystem further comprises a second sensor cable segment coupled at one longitudinal end to the first sensor cable segment, the second sensor cable segment comprising:
   a second plurality of spaced apart electrodes positioned with respect to the second sensor cable segment to electrically contact the body of water when the second sensor cable segment is immersed therein, and
   a second plurality of electrical conductors, each of the second plurality of electrical conductors extending from one longitudinal end of the second sensor cable segment to the other,
   wherein each of the second plurality of spaced apart electrodes is respectively coupled to a different conductor from the second plurality of electrical conductors.

9. The system of claim 8 wherein the first signal processing module comprises a first multi-pole switch configured to make selective connection between any pair of electrodes selected from the first plurality of electrodes and the second plurality of electrodes.

10. The system of claim 9 wherein the first multi-pole switch comprises a software controlled electronic switch.

11. The system of claim 8 further comprising a second signal processing module coupled to a longitudinal end of the first sensor cable subsystem, the second signal processing module comprising a second voltage measuring circuit electrically connected between two or more electrodes selected from the first plurality of electrodes and the second plurality of electrodes.

12. The system of claim 1 further comprising a second signal processing module coupled to the opposed longitudinal end of the first sensor cable segment as the first signal processing module, the second signal processing module comprising a second voltage measuring circuit electrically connected between two or more electrodes from the first plurality of electrodes.

13. The system of claim 1 wherein the first sensor cable subsystem is coupled to a tow cable extending from a survey vessel, the first sensor cable subsystem configured so that either the first sensor cable segment or the signal processing module is connectable to the tow cable.

14. The system of claim 1 further comprising a second sensor cable subsystem coupled to a longitudinal end of the first sensor cable subsystem, the second sensor cable subsystem comprising:

at least a second sensor cable segment comprising:
  a second plurality of spaced apart electrodes positioned with respect to the second sensor cable segment to electrically contact the body of water when the second sensor cable segment is immersed therein, and
  a second plurality of electrical conductors, each of the second plurality of electrical conductors extending from one longitudinal end of the second sensor cable segment to the other,
  wherein each of the second plurality of spaced apart electrodes is respectively coupled to a different conductor from the second plurality of electrical conductors; and
  a second signal processing module electrically coupled to the second sensor cable segment at a longitudinal end thereof, the signal processing module including a second voltage measuring circuit electrically connected between two or more electrodes from the second plurality of electrodes.

15. A method for conducting a marine electromagnetic survey, the method comprising:
towing a marine electromagnetic sensor cable system through a body of water, the marine electromagnetic sensor cable system comprising a first sensor cable subsystem comprising:
  at least a first sensor cable segment comprising:
    a first plurality of spaced apart electrodes positioned with respect to the first sensor cable segment to electrically contact the body of water when the first sensor cable segment is immersed therein, and
    a first plurality of electrical conductors, each of the first plurality of electrical conductors extending from one longitudinal end of the first sensor cable segment to the other,
    wherein each of the first plurality of spaced apart electrodes is respectively coupled to a different conductor from the first plurality of electrical conductors; and
  a first signal processing module electrically coupled to the first sensor cable segment at a longitudinal end thereof, the signal processing module including a first voltage measuring circuit; and
measuring a first voltage between two or more electrodes from the first plurality of electrodes with the first voltage measuring circuit.

16. The method of claim 15 wherein the first signal processing module comprises a first multi-pole switch, the method further comprising: using the first multi-pole switch to make selective connection between any pair of the two or more electrodes connected to the first voltage measuring circuit.

17. The method of claim 16 further comprising dynamically switching the multi-pole switch while towing the marine electromagnetic sensor cable system through the body of water.

18. The method of claim 15 further comprising: using circuitry of the first signal processing module to amplify and digitize measurements of the first voltage.

19. The method of claim 18 wherein the first sensor cable subsystem further comprises an electrical to optical converter coupled to an output of the digitizing circuitry of the signal processing module, an optical fiber coupled to an output of the converter and wherein the first sensor cable segment comprises an optical fiber extending from one longitudinal end of the first sensor cable segment to the other.

20. The method of claim 15 wherein the first sensor cable subsystem further comprises an end plug coupled to an aft end of the first sensor cable subsystem.

21. The method of claim 15 wherein the first sensor cable subsystem further comprises an hennaphroditic connector disposed at each longitudinal end of the first sensor cable segment.

22. The method of claim 15 wherein:
the first sensor cable subsystem further comprises a second sensor cable segment coupled at one longitudinal end to the first sensor cable segment, the second sensor cable segment comprising:
  a second plurality of spaced apart electrodes positioned with respect to the second sensor cable segment to electrically contact the body of water when the second sensor cable segment is immersed therein, and
  a second plurality of electrical conductors, each of the second plurality of electrical conductors extending from one longitudinal end of the second sensor cable segment to the other,
  wherein each of the second plurality of spaced apart electrodes is respectively coupled to a different conductor from the second plurality of electrical conductors, and
the method further comprises measuring a second voltage between two or more electrodes, each electrode selected from either the first plurality of electrodes or the second plurality of electrodes, with the first voltage measuring circuit.

23. The method of claim 22 wherein the first signal processing module comprises a first multi-pole switch, the method further comprising: using the first multi-pole switch to make selective connection between any pair of electrodes selected from the first plurality of electrodes and the second plurality of electrodes.

24. The method of claim 15 wherein:
the sensor cable system further comprises a second sensor cable subsystem configured substantially the same as the first sensor cable subsystem, and
the method further comprises measuring a second voltage between two or more electrodes, each electrode selected from the plurality of electrodes in either the first or the second sensor cable subsystems, with the voltage measuring circuit of the second sensor cable subsystem.

25. The method of claim 24 further comprises synthesizing a third voltage from the first voltage and the second voltage.

26. A method for conducting a marine electromagnetic survey, the method comprising:
towing a marine electromagnetic sensor cable system through a body of water, the marine electromagnetic sensor cable system comprising a plurality of sensor cable subsystems comprising, each sensor cable subsystem comprising:
  one or more sensor cable segments coupled at longitudinal ends, each sensor cable segment comprising:
    a plurality of spaced apart electrodes positioned with respect to the sensor cable segment to electrically contact the body of water when the sensor cable segment is immersed therein, and
    a plurality of electrical conductors, each of the plurality of electrical conductors extending from one longitudinal end of the sensor cable segment to the other,
    wherein each of the plurality of spaced apart electrodes is respectively coupled to a different conductor from the plurality of electrical conductors; and a signal processing module electrically coupled to one of the one or more sensor cable segment at a longitudinal end thereof, the signal processing module including a voltage measuring circuit; and measuring a first voltage between a first pair of electrodes, each electrode selected from any of the plurality of electrodes with a first voltage measuring circuit from any of the signal processing modules;

measuring a second voltage between a second pair of electrodes, each electrode selected from any of the plurality of electrodes with a second voltage measuring circuit from any of the signal processing modules, wherein the first pair of electrodes is not identical to the second pair of electrodes; and synthesizing a third voltage from the first voltage and the second voltage.

* * * * *